United States Patent
Ikeda et al.

(10) Patent No.: US 8,043,672 B2
(45) Date of Patent: Oct. 25, 2011

(54) LENS FOR A VEHICULAR LAMP AND MANUFACTURING METHOD FOR THE SAME

(75) Inventors: Toshimasa Ikeda, Shizuoka (JP); Masami Nakajima, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 1070 days.

(21) Appl. No.: 11/050,866

(22) Filed: Feb. 7, 2005

(65) Prior Publication Data
US 2005/0174798 A1  Aug. 11, 2005

(30) Foreign Application Priority Data
Feb. 6, 2004 (JP) ............................. P.2004-031041

(51) Int. Cl.
*B32B 1/00* (2006.01)
*B32B 25/00* (2006.01)

(52) U.S. Cl. .................. 428/35.7; 428/34.1; 428/34.2; 428/35.9; 428/36.9

(58) Field of Classification Search .............. 428/34.1, 428/34.2, 35.7, 35.9, 36.9
See application file for complete search history.

(56) References Cited

U.S. PATENT DOCUMENTS

| 4,701,288 A | * | 10/1987 | Cook et al. | .................... 264/1.38 |
| 5,642,228 A | | 6/1997 | Takezawa et al. | |
| 5,756,013 A | | 5/1998 | Yanagihara et al. | |
| 5,922,369 A | | 7/1999 | Yanagihara et al. | |
| 6,001,953 A | * | 12/1999 | Davis et al. | .................... 528/196 |
| 6,113,254 A | | 9/2000 | Kaneko | |
| 6,252,002 B1 | * | 6/2001 | Yamada et al. | ................ 525/228 |
| 6,274,228 B1 | * | 8/2001 | Ramesh et al. | ................ 428/213 |
| 6,439,872 B1 | | 8/2002 | Yoshinaga et al. | |

FOREIGN PATENT DOCUMENTS

| JP | 60-201935 A | 10/1985 |
| JP | 2000-329910 A | 11/2000 |
| JP | 2003-025377 A | 1/2003 |

* cited by examiner

*Primary Examiner* — Marc Patterson
(74) *Attorney, Agent, or Firm* — Sughrue Mion, PLLC

(57) ABSTRACT

In a vehicular lamp 10 having a lens 40 in which plastic molded portions 41, 42, 43 respectively having two or more colors are integrally formed, the lens is formed by injection molding process. As compared with the molecular weight of a plastic constituting each of first plastic molded portions 41, 43, which are earlier injected, the molecular weight of a plastic, which constitutes a plastic molded portion 42 to be injected after the injection of the first plastic molded portions, is set to be small.

3 Claims, 3 Drawing Sheets

LENS FOR A VEHICULAR LAMP AND MANUFACTURING METHOD FOR THE SAME

The present invention claims foreign priority to Japanese patent application no. 2004-031041, filed on Feb. 6, 2004, the contents of which is incorporated herein by reference.

BACKGROUND OF THE INVENTION

1. Field of the Invention

The present invention relates to a lens for a vehicular lamp and to a manufacturing method for the same. More particularly, the present invention relates to a technique for preventing a vehicular lamp having a lens, in which plastic molded parts respectively having two or more colors are integrally formed, from mixing the color of one of the plastic molded parts with another one of the colors.

2. Description of the Related Art

There has been a vehicular lamp provided with a lens in which plastic molded parts respectively having two or more colors are integrally formed. A plastic lens has often been used as the lens of the vehicular lamp. Especially, a multicolor molded lens, in which plural plastic parts having different colors are integrally formed by performing what is called a multicolor molding method, has been used as a marker light. Thus, in the manufacture of a multifunction marker lamp constituted by combining marker lamps having different functions with one another, the process of molding a lens has been simplified. Also, parts-management has been simplified. Consequently, these have contributed to reduced cost.

Meanwhile, a conventional multicolor molded lens has been molded by using plural plastics, which are of the same kind and have similar physical properties and different colors, so as to improve the integration of plural plastic molded portions.

Thus, the conventional lens has a problem that the color of one of the plastic molded portions is mixed with the color of one of the plastic molded portions respectively having the other colors. In a case where there is a difference in depth between or among the colors of the plastic portions, when the portion which is lighter in color is post-molded, the abovementioned problem is occurred, for example, the combination of red and amber portions, or the combination of red, amber, and clear (or colorless transparent) portions. In other words, in a case where the portion, which is deeper in color, is earlier injected (or pre-molded), and where the plastic portion, which is lighter in color, is then injected by leaving the plastic molded portion, which is deeper in color, in a mold, heat of the post-molded plastic portion is transmitted to the pre-molded plastic portion. At this time, the pre-molded plastic portion is dragged by the post-molded plastic portion. Thus, a phenomenon, in which the color of the pre-molded plastic portion is mixed with that of the post-molded plastic portion, that is, what is called color mixture is caused.

Further, for instance, in the lens of a vehicular marker lamp, the clear portion is often post-molded as a collecting-side resin so as to integrate the plural portions. For instance, in a case where a lens having three plastic molded portions, that is, red, amber, and clear plastic molded portions is molded, the red portion and the amber portion are molded at a first injection-molding step. The clear portion is molded at a second step. Then, the clear portion is formed integrally with the red portion and the amber portion. Consequently, a lens, in which the red portion, the amber portion, and the clear portion are integrated, is formed. At that time, in a case where the three portions are simply abutted against one another at an end portion, the strengths of joint parts of the portions may be insufficient. Thus, a part of the clear portion is often laminated on the red portion and the amber portion. The reason for using this clear plastic portion as the collecting-side resin is that even when the clear portion is laminated on the red portion and the amber portion, the color hues of the red portion and the amber portion are not changed. Consequently, the area of a part, at which the clear portion makes contact with each of the red portion and the amber portion, increases, so that the joint strength therebetween can be sufficiently ensured.

As described above, in the case that the clear plastic portion is used as the collecting-side resin, when the color of the pre-molded plastic portion is mixed with that of a region used as the clear portion, the appearance of the lens is disfigured.

SUMMARY OF THE PRESENT INVENTION

The present invention is accomplished in view of the aforementioned drawbacks. An object of the present invention is to prevent the color of a pre-molded plastic portion from being mixed with the color of a post-molded plastic portion.

To solve the aforementioned problem, according to a first aspect of the present invention, there is provided a lens for a vehicular lamp, the lens which is integrally formed of plastic molded portions having plurality of colors by injection molding, comprising:

a first plastic molded portion having a first molecular weight; and a second plastic molded portion having a second molecular weight which is smaller than the first molecular weight, wherein the second plastic molded portion is injected after the first plastic molded portion is injected.

According to a second aspect of the present invention as set forth in the first aspect of the present invention, it is preferable that the lens further comprising:

a laminated layer portion which is formed such that the first plastic molded portion and the second plastic molded portion are laminated each other.

According to a third aspect of the present invention as set forth in the first aspect of the present invention, it is preferable that the first and second plastic molded portions are made of acrylic resins including polymethyl metaacrylate, and a molecular weight of the acrylic resin constituting the first plastic molded portion is larger than a molecular weight of the acrylic resin constituting the second plastic molded portion by 20,000 or more.

According to a fourth aspect of the present invention as set forth in the first aspect of the present invention, it is preferable that the first and second plastic molded portions are made of polycarbonates, and a molecular weight of the polycarbonate constituting the first plastic molded portion is larger than a molecular weight of the polycarbonate constituting the second plastic molded portion by 2,000 or more.

According to a fifth aspect of the present invention, there is provided a manufacturing method for a lens for a vehicular lamp, the lens which is integrally formed of plastic molded portions having plurality of colors by injection molding, the method comprising the steps of:

injecting a first plastic; and injecting a second plastic whose molecular weight is smaller than a molecular weight of the first plastic.

Thus, according to the present invention, the plastic of the plastic portion, which is earlier injected, is hardly mixed with the plastic of the plastic portion, which is injected after the injection of the earlier injected plastic.

According to a sixth aspect of the present invention, there is provided a vehicular lamp, comprising:

a lamp body including a concave portion having an opening;

a light source provided in the concave portion; and a lens provided so as to cover the opening of the lamp body, wherein the lens is integrally formed of plastic portions having plurality of colors by injection molding, and the lens comprises:

a first plastic molded portion having a first molecular weight; and a second plastic molded portion having a second molecular weight which is smaller than the first molecular weight, wherein the second plastic molded portion is injected after the first plastic molded portion is injected.

According to a seventh aspect of the present invention as set forth in the first aspect of the present invention, it is more preferable that the first plastic molded portion is colored, and the second plastic molded portion is colorless.

The lens according to the present invention, in which plastic molded portions respectively having two or more colors are integrally formed, and features that the lens is formed by performing an injection-molding process, and that as compared with the molecular weight of a plastic (hereinafter referred to as a "first plastic") constituting each of first plastic molded portions that are earlier injected, a molecular weight of a plastic (hereinafter referred to as a "second plastic"), which constitutes a plastic molded portion to be injected after the injection of the first plastic, is set to be small.

Thus, in the lens according to the present invention, the molecular weight of the first plastic, which is earlier injected, is larger than that of the second plastic that is injected after the injection of the first plastic. Therefore, the coefficient of viscosity of the first plastic is higher than that of viscosity of the second plastic. Hence, when the second plastic is injected, the first plastic is hardly dragged by the flowing second plastic. Consequently, the first plastic is scarcely mixed with the second plastic. That is, the color of each of the first plastic molded portions is hardly mixed with that of the second plastic molded portion.

According to the second aspect of the present invention, the lens further comprises a laminated layer portion in which the first plastic molded portions and the second plastic molded portion are laminated one on the other. Thus, the area of a part of the first plastic molded portions, which is in contact with the second plastic molded portion, increases. However, the color of each of the first plastic molded portions is hardly mixed with that of the second plastic molded portion.

According to the third aspect of the present invention, both the first plastic and the second plastic are acrylic resins (i.e., PMMAs; polymethyl metaacrylates). The molecular weight of the acrylic resin constituting each of the first plastic molded portions is larger than that of the acrylic resin constituting the second plastic molded portion by 20,000 or more. Thus, the color of each of the first plastic molded portions is hardly mixed with that of the second plastic molded portion.

According to the fourth aspect of the present invention, both the first plastic and the second plastic are polycarbonates (PCs). The molecular weight of the polycarbonate constituting the first plastic molded portions is larger than that of the polycarbonate constituting the second plastic molded portion by 2,000 or more. Thus, the color of each of the first plastic molded portions is hardly mixed with that of the second plastic molded portion.

A manufacturing method for a lens for a vehicular lamp, in which plastic molded portions respectively having two or more colors are integrally formed, according to the present invention, a process of forming the lens includes a first injection step of injecting a first plastic, and a second injection step of injecting a second plastic, whose molecular weight is smaller than a molecular weight of the first plastic.

Thus, in accordance with the manufacturing method for a lens for a vehicular lamp according to the present invention, the molecular weight of the first plastic, which is earlier injected, is larger than that of the plastic, which is injected after the injection of the first plastic. Therefore, the coefficient of viscosity of the first plastic is higher than that of viscosity of the second plastic. Consequently, when the second plastic is injected, the first plastic is hardly dragged by the flowing second plastic. Thus, the first plastic is scarcely mixed with the second plastic. That is, the color of each of the first plastic molded portions is hardly mixed with that of the second plastic molded portion.

DETAILED DESCRIPTION OF THE PREFERRED EMBODIMENTS

Hereinafter, best modes for carrying out a lens for a vehicular lamp according to the present invention and a manufacturing method therefor according to the present invention are described with reference to the accompanying drawings.

Figure 1:
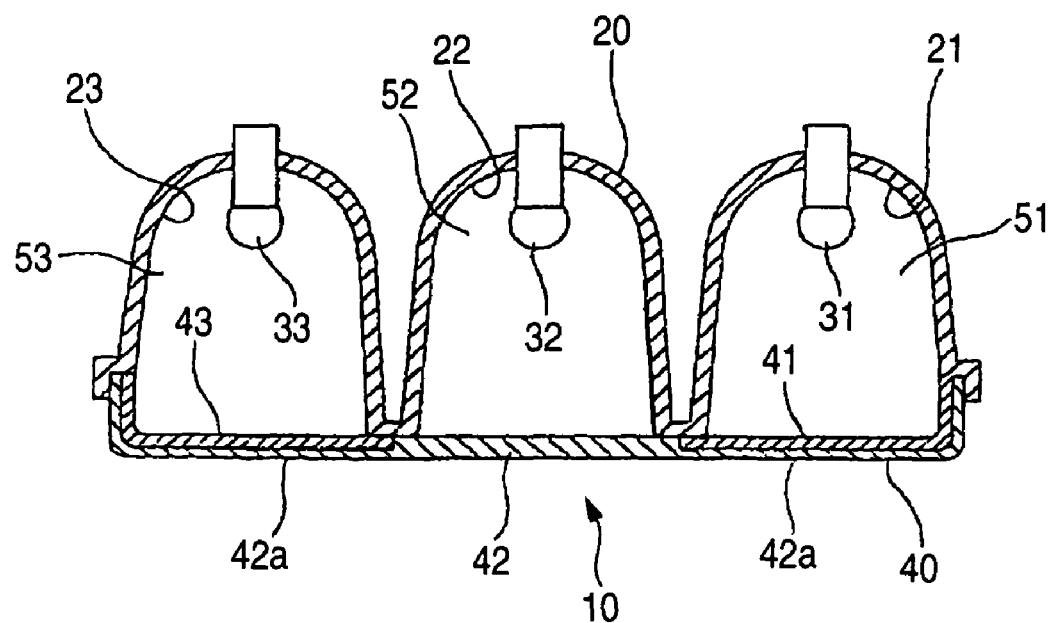
FIG. 1 illustrates an embodiment of a lens for a vehicular lamp according to the present invention and that of a manufacturing method therefor according to the present invention, and is a schematic horizontal cross-sectional view showing the vehicular lamp.

An outline of the lens for the vehicular lamp according to the present invention is described hereinafter by referring to FIG. 1.

A vehicular lamp 10 has a lamp body 20, in which three concave portions 21, 22, and 23 frontwardly opened are formed. Further, light source bulbs 31, 32, and 33 are disposed in the concave portions 21, 22, and 23, respectively.

Figure 4:
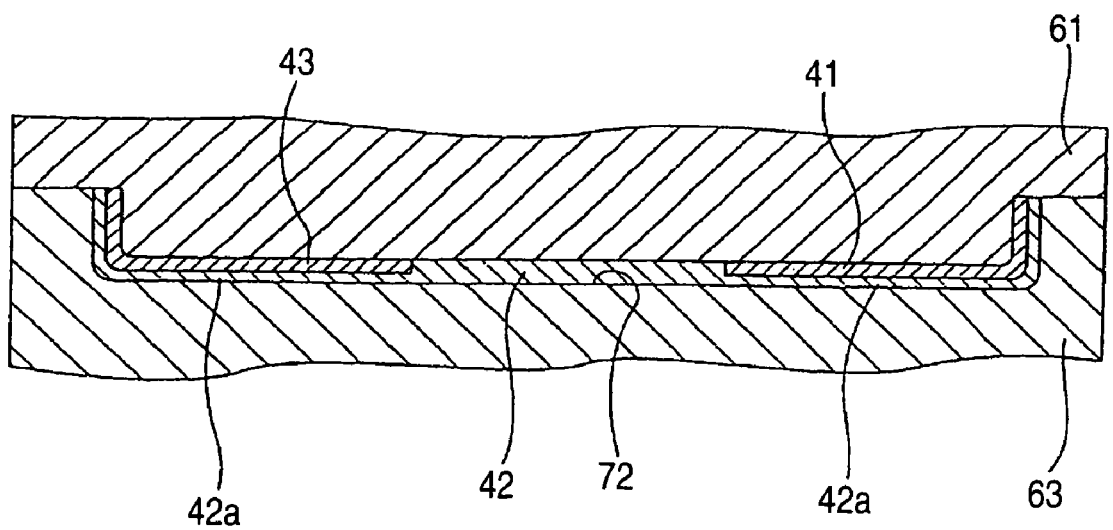
FIG. 4 is a view illustrating a state in which a second plastic molded portion is injected.

A lens 40 is placed in such a way as to cover the front face of the lamp body 20, so that three lamp chambers 51, 52, 53 are defined. As is seen from FIGS. 1 and 4, the lens 40 is formed by integrally forming three plastic molded portions 41, 42, and 43 with one another. The plastic molded portion 41 is formed of a red plastic. The plastic molded portion 42 is formed of a clear plastic. The plastic molded portion 43 is formed of an amber plastic.

The lens 40 is formed as follows.

Figure 2:
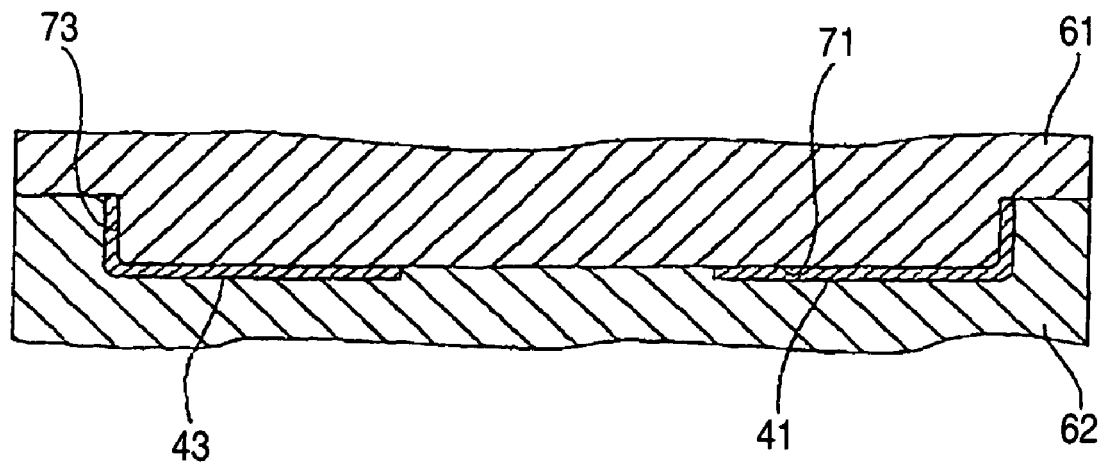
FIG. 2 is a schematic cross-sectional view that illustrates, together with FIGS. 3 and 4, the process of molding a lens and that shows a state in which a first plastic molded portion is molded.

First, two mold members 61, 62 are clamped. Then, a cavity 71, into which the red plastic is injected, and a cavity 73, into which an amber plastic is injected, are formed. Subsequently, the predetermined plastics are injected into the cavities 71 and 72, respectively. Thus, two parts of the first plastic molded portions 41, 43 are formed (see FIG. 2).

Figure 3:
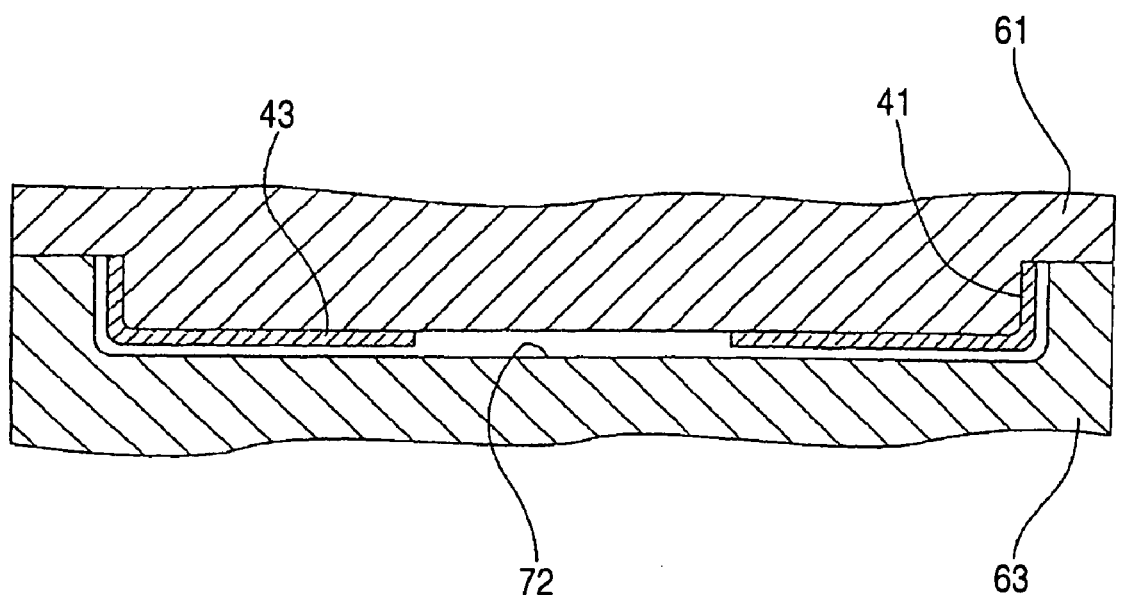
FIG. 3 is a view illustrating a state in which a cavity for molding a second plastic molded portion is formed.

Subsequently, one of the mold members 62 is removed. Instead, another mold member 63 is clamped to the mold member 61 holding the two plastic molded portions 41 and 43, so that a cavity 72, into which the clear plastic is injected, is formed (see FIG. 3). Then, the clear plastic is injected into the cavity 72 to thereby form the plastic molded portion 42. Moreover, thin clear plastic layers 42a, 42a constituting the second plastic molded portion 42 are laminated integrally with the surface sides of the first plastic molded portions 41 and 43. Thus, the lens 40, in which the three plastic molded portions 41, 42, and 43 are formed integrally with one another, is formed (see FIG. 4).

Further, it is important that the molecular weight of the plastic constituting the plastic being post-molded (hereunder referred to as "second plastic"), which is injected after the injection of the first plastic molded portions. That is, the second plastic molded portion 42 is smaller than the molecular weight of the plastic constituting each of the plastics (hereunder referred to as "first plastic") being pre-molded, which is injected earlier and constituting the first plastic molded portions 41 and 43.

Figure 5:
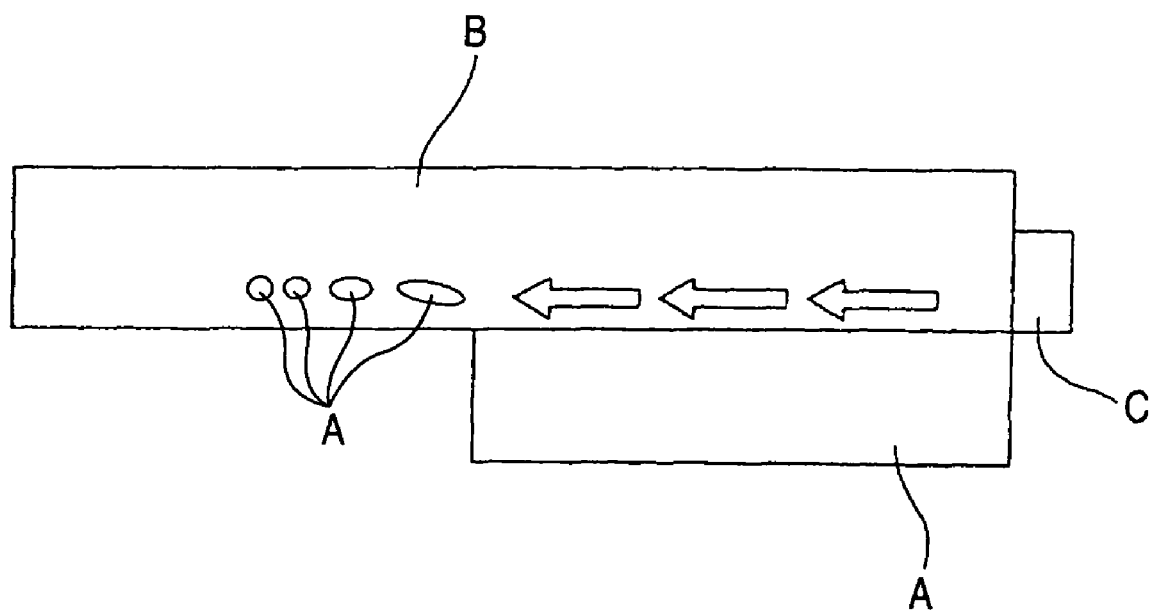
FIG. 5 is a schematic view illustrating a mechanism for causing color-mixing.

In a case where the second plastic molded portion "B" is post-molded on the first plastic molded portion "A", as schematically illustrated in FIG. 5, and "C" denotes the position of a gate, the first plastics are softened by heat of the second plastic, and dragged by the flow of the second plastic in the direction of arrows. Consequently, the first plastic is mixed with the second plastic molded portion "B". This is considered as the cause of what is called the color-mixing. In a case where there is a difference in coefficient of viscosity between the first plastic and the second plastic, when the two plastics are brought into contact with each other, the flowing plastic starts dragging the other plastic. Thereafter, as hearing force acts, so that apart of the plastic having a smaller coefficient of viscosity is left in the plastic having a larger coefficient of viscosity. Thus, when the coefficient of viscosity of the second plastic is set to be smaller that that of viscosity of the first plastic, parts of the second plastic, which are put into contact with the first plastic, are made to be left in the first plastic. The first plastic is hardly dragged ahead by the flow of the second plastic. An occurrence of the color-mixing is scarcely recognized. Further, the molecular weight depends upon the coefficient of viscosity. The larger the molecular weight becomes, the higher the value of the coefficient of viscosity does. Thus, the possibility of an occurrence of the color-mixing can be substantially completely eliminated by setting the molecular weight of the second plastic to be smaller than that of the first plastic.

Acrylic resins (including PMMA; polymethyl metaacrylate) and polycarbonate (PC) are frequently used as the material of the lens of the vehicular lamp. In a case where both the first plastic and the second plastic are acrylic resins, preferably, the molecular weight of the first plastic is set to be larger than that of the second plastic by 20000 or more. Furthermore, it is preferable that the molecular weight of the first plastic is set to be about 80000 and that of the second plastic is set to be about 100000 or more. Meanwhile, in a case where both the first plastic and the second plastic are polycarbonates, preferably, the molecular weight of the first plastic is set to be larger than that of the second plastic by 2000 or more. Consequently, when the lens is observed at a distance of 30 cm to 50 cm therefrom, an occurrence of the color-mixing cannot be recognized.

Incidentally, in the foregoing description of the embodiment, the lens, in which the three plastic molded portions are integrally formed, has been exemplified. However, the lens of the vehicular lamp according to the present invention is not limited thereto. Needless to say, the present invention can be applied to a lens, in which two plastic molded portions are integrally formed, and to lenses, in each of which four or more plastic molded portions are integrally formed.

Additionally, the shapes and the structures described in the foregoing description of the embodiment are mere examples of embodiment in carrying out the present invention, and the technical scope of the present invention should not be restrictively construed according to these shapes and structures.

The present invention can widely be applied to vehicular lamps each having a lens in which plastic molded portions having different colors are integrally formed.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A lens for a vehicular lamp, the lens which is integrally formed of plastic molded portions having plurality of colors by injection molding, comprising:
   a first plastic molded portion having a first number average molecular weight; and
   a second plastic molded portion having a second number average molecular weight which is smaller than the first molecular weight,
   wherein the second plastic molded portion is injected after the first plastic molded portion is injected,
   wherein the first and second plastic molded portions are made of acrylic resins including polymethyl methacrylate, and
   a number average molecular weight of the acrylic resin constituting the first plastic molded portion is larger than a molecular weight of the acrylic resin constituting the second plastic molded portion by 20,000 or more.

2. The lens for the vehicular lamp as set forth in claim 1, further comprising:
   a laminated layer portion which is formed such that the first plastic molded portion and the second plastic molded portion are laminated each other.

3. The lens for the vehicular lamp as set forth in claim 1, wherein the first plastic molded portion is colored, and the second plastic molded portion is colorless.

* * * * *